United States Patent
Yamada et al.

(10) Patent No.: US 7,859,207 B2
(45) Date of Patent: Dec. 28, 2010

(54) METHOD AND APPARATUS FOR CONTROLLING ELECTRIC MOTOR

(75) Inventors: Yohei Yamada, Aichi-ken (JP); Hitoshi Fukada, Aichi-ken (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 353 days.

(21) Appl. No.: 12/185,963

(22) Filed: Aug. 5, 2008

(65) Prior Publication Data

US 2009/0039813 A1 Feb. 12, 2009

(30) Foreign Application Priority Data

Aug. 6, 2007 (JP) .............................. 2007-204522
Apr. 4, 2008 (JP) .............................. 2008-097950

(51) Int. Cl.
 *H02P 21/00* (2006.01)
(52) U.S. Cl. .................. 318/400.02; 318/799; 318/471
(58) Field of Classification Search ................. 318/139, 318/400.01, 400.02, 400.15, 798, 799, 801, 318/471
See application file for complete search history.

(56) References Cited

U.S. PATENT DOCUMENTS

| 5,334,923 | A | * | 8/1994 | Lorenz et al. | ............... 318/805 |
| 6,678,174 | B2 | * | 1/2004 | Suzui et al. | .................. 363/55 |
| 2003/0006738 | A1 | * | 1/2003 | Duff, Jr. | ..................... 320/166 |
| 2007/0152624 | A1 | * | 7/2007 | Hamaoka et al. | ............ 318/805 |

FOREIGN PATENT DOCUMENTS

JP 6038543 2/1994

* cited by examiner

*Primary Examiner*—Rina I Duda
(74) *Attorney, Agent, or Firm*—Woodcock Washburn LLP

(57) ABSTRACT

A method for controlling a motor current supplied to an electric motor by using an inverter device is provided. The inverter device includes an inverter circuit and a capacitor connected to an input of the inverter circuit. The method includes controlling the inverter circuit in such a manner as to supply an alternating electric current to the electric motor after the temperature of the capacitor reaches a temperature at which a maximum acceptable motor current value becomes greater than or equal to a value at which the torque necessary for starting the electric motor is produced.

7 Claims, 6 Drawing Sheets

METHOD AND APPARATUS FOR CONTROLLING ELECTRIC MOTOR

CROSS REFERENCE TO RELATED APPLICATIONS

This application claims priority to Japanese Patent Application Nos. 2007-204522 filed Aug. 6, 2007 and 2008-097950 filed Apr. 4, 2008.

FIELD OF THE INVENTION

The present invention relates to a method and an apparatus for controlling an electric motor using an inverter device.

BACKGROUND OF THE INVENTION

Conventionally, a PWM control inverter device for controlling an electric motor is known. The inverter device uses a power transistor or an IGBT (insulated gate bipolar transistor) as a control element. The switching speed of the power transistor or the IGBT is higher than the switching speed of a thyristor inverter. Thus, if the cable (the wire) connecting the inverter device to the electric motor is long, a surge voltage greater than twice the crest value of the output voltage of the inverter is produced between the terminals of the electric motor. The surge voltage may damage a coil of the electric motor or cause insulation breakdown.

Japanese Laid-Open Patent Publication No. 6-38543 discloses a control apparatus that suppresses the generation of a surge voltage. The control apparatus includes a reactor connected to the output of an inverter device and a surge voltage suppressing device connected to the reactor and a terminal of an electric motor. The surge voltage suppressing device includes a circuit in which a capacitor and a resistor are connected in series with each other.

The inverter device includes an inverter circuit and a smoothing capacitor. The inverter circuit is configured by a combination of a plurality of semiconductor elements. The smoothing capacitor is connected in parallel with a power supply (a battery). The capacitor has a resistance element caused by the resistance of an electrode or depending on characteristics of a dielectric body. Such a resistance element is called "equivalent series resistance (ESR)". The ESR may be ignored at temperatures ranging from ambient levels to high levels. However, under a low temperature (which is, for example, 0° C. or lower), the ESR increases to a level at which the ESR cannot be ignored. When the electric motor is driven using the aforementioned inverter device, a motor current flowing in the capacitor produces a surge voltage caused by the ESR. If the surge voltage exceeds the withstanding voltage of a semiconductor element, the semiconductor element becomes damaged. Thus, if a motor current is supplied to the electric motor by controlling the inverter device in which the capacitor is connected to the input of the inverter circuit when the ambient temperature (the temperature of the environment) of the PWM control inverter device is 0° C. or lower, influence by the ESR of the capacitor must be taken into consideration.

To prevent components of the inverter device from being damaged by the surge voltage, some control apparatuses have a map that stores a maximum acceptable motor current value. The maximum acceptable motor current value represents the maximum value of a motor current that can be supplied to the electric motor at each temperature. Such a control apparatus controls an inverter device based on the map.

However, even for capacitors of a common standard, the level of the ESR greatly varies from product to product. Thus, with such variation taken into consideration, a large safety margin is given to the map storing maximum acceptable motor current value with respect to the ambient temperature. This decreases the value of the electric current supplied to the electric motor, thus reducing the operating range of the electric motor.

Particularly, in an industrial vehicle (a forklift) that includes an electric compressor for an air conditioner, refrigerant compressed by the compressor may liquefy when the vehicle operates in a cold storage warehouse. This increases the torque necessary for compressing the liquefied refrigerant and the torque for starting the electric motor. The maximum acceptable motor current value thus becomes smaller than a value at which the torque necessary for starting the electric motor is produced.

SUMMARY OF THE INVENTION

Accordingly, it is an objective of the present invention to provide a method and an apparatus for controlling an electric motor by which the electric motor is actuated while generation of an excessively great surge voltage is suppressed.

To achieve the foregoing objective and in accordance with one aspect of the present invention, a method for adjusting a motor current supplied to an electric motor using an inverter device is provided. The inverter device includes an inverter circuit and a capacitor connected to an input of the inverter circuit. The method includes: setting a maximum acceptable motor current value using a map or an expression representing a relationship between a temperature of the capacitor and a maximum value of the motor current that prevents a component of the inverter device from being damaged by a surge voltage produced by an equivalent series resistance of the capacitor; estimating a rotational position of a rotor of the electric motor and controlling the inverter circuit in such a manner as to supply a direct electric current smaller than the maximum acceptable motor current value to the electric motor as a d-axis electric current if the temperature of the capacitor is in a range in which the maximum acceptable motor current value is smaller than a value at which a torque necessary for starting the electric motor is produced; and controlling the inverter circuit in such a manner as to supply an alternating electric current to the electric motor after the temperature of the capacitor reaches a temperature at which the maximum acceptable motor current value becomes greater than or equal to the value at which the torque necessary for starting the electric motor is produced.

In accordance with another aspect of the present invention, an apparatus for adjusting a motor current supplied to an electric motor using an inverter device is provided. The inverter device includes an inverter circuit and a capacitor connected to an input of the inverter circuit. The apparatus includes a temperature detecting section, a memory section, a rotor position estimating section, a maximum acceptable motor current value calculating section, and an inverter device control section. The temperature detecting section detects a temperature of the capacitor or a temperature reflecting the temperature of the capacitor. The memory section stores a map or an expression representing a relationship between a maximum acceptable motor current value and the temperature of the capacitor. The maximum acceptable motor current value is a maximum value of the motor current that prevents a component of the inverter device from being damaged by a surge voltage produced by an equivalent series resistance of the capacitor. The rotor position estimating section estimates a rotational position of a rotor of the electric motor. The maximum acceptable motor current value calculating section calculates the maximum acceptable motor current value corresponding to the temperature of the capacitor based on a temperature detected by the temperature detecting section and either of the map or the expression. The inverter device control section controls the inverter circuit in such a manner as to supply a direct electric current smaller than the maximum acceptable motor current value to the electric motor as a d-axis electric current based on the rotational position of the rotor estimated by the rotor position estimating section and the maximum acceptable motor current value calculated by the maximum acceptable motor current value calculating section.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A control apparatus 11 according to a first embodiment of the present invention will now be described with reference to FIGS. 1 to 5. The control apparatus 11 controls an electric motor 10 for an electric compressor of an air conditioner mounted in a vehicle.

Figure 1:
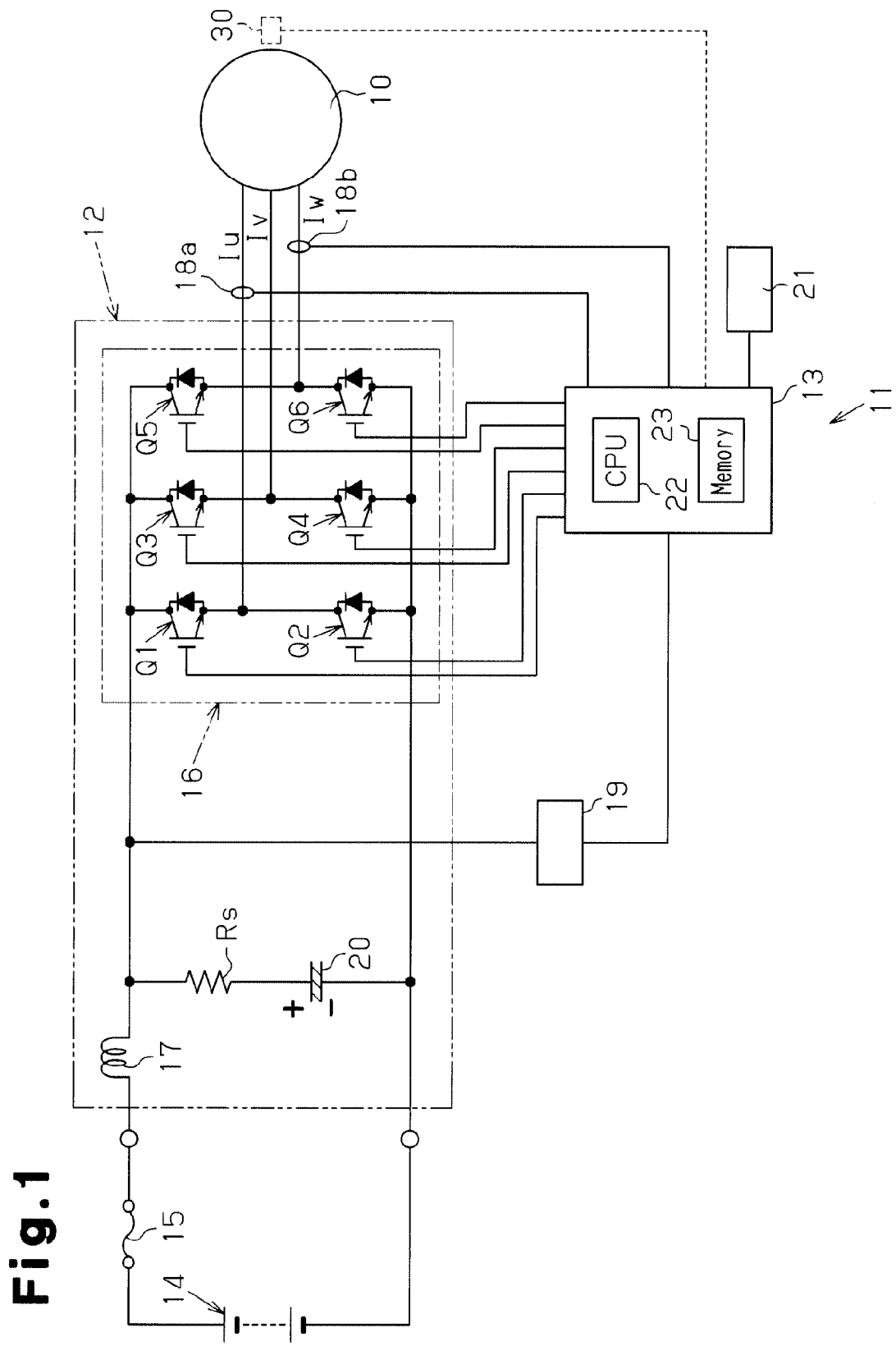
FIG. 1 is a diagram showing a control apparatus according to a first embodiment of the present invention.

As shown in FIG. 1, the control apparatus 11 of the electric motor 10 has an inverter device 12 and a control section 13 serving as an inverter device control section. The electric motor 10 is a three-phase AC motor. The inverter device 12 is connected to a main battery 14, or a power supply for driving the vehicle, through a fuse 15.

The inverter device 12 includes an inverter circuit 16 having six switching elements Q1, Q2, Q3, Q4, Q5, Q6. Each of the switching elements Q1 to Q6 is an IGBT (insulated gate bipolar transistor). In the inverter circuit 16, the first switching element Q1, the third switching element Q3, and the fifth switching element Q5 are connected in series with the second switching element Q2, the fourth switching element Q4, and the sixth switching elements Q6, respectively. The first, third, and fifth switching elements Q1, Q3, and Q5 are connected to the positive terminal of the main battery 14 through a coil 17 and the fuse 15. The second, fourth, and sixth switching elements Q2, Q4, and Q6 are connected to the negative terminal of the main battery 14. The node between the switching element Q1 and the switching element Q2 is connected to the U phase terminal of the electric motor 10. The node between the switching element Q3 and the switching element Q4 is connected to the V phase terminal of the electric motor 10. The node between the switching element Q5 and the switching element Q6 is connected to the W phase terminal of the electric motor 10.

Electric current sensors 18a, 18b, which are electric current detecting sections, are provided in a cable connecting the inverter device 12 to the electric motor 10. The electric current sensors 18a, 18b detect two of the electric currents Iu, Iv, Iw in the three phases (in the first embodiment, the electric currents of the U and W phases), which are supplied to the electric motor 10, or the electric currents Iu, Iw. The control apparatus 11 includes a voltage sensor 19 connected to the inverter device 12.

The inverter circuit 16 is connected to a capacitor (an input capacitor) 20 connected in parallel with the main battery 14. The capacitor 20 of the first embodiment is an electrolytic capacitor. The first, third, and fifth switching elements Q1, Q3, and Q5 are connected to the positive terminal of the capacitor 20. The second, fourth, and sixth switching elements Q2, Q4, and Q6 are connected to the negative terminal of the capacitor 20. FIG. 1 illustrates a resistor Rs connected in series with the capacitor 20. The resistor Rs represents equivalent series resistance (ESR) of the capacitor 20.

The control apparatus 11 also includes a temperature sensor 21, or a temperature detecting section detecting a temperature that reflects the temperature of the capacitor 20. The temperature sensor 21 is connected to the control section 13. As long as the temperature sensor 21 is located at a position at which the temperature sensor 21 is capable of measuring a temperature reflecting the temperature of the capacitor 20, the temperature sensor 21 may be arranged at any suitable position. That is, the position of the temperature sensor 21 is not restricted to a position in the close vicinity of the capacitor 20. In the first embodiment, the temperature sensor 21 is located in the vicinity of the switching elements.

The control section 13, which controls the inverter device 12, includes a CPU (central processing unit) 22 and a memory 23 serving as a memory section. The memory 23 stores control programs according to which the electric motor 10 is controlled and data and maps needed to perform the control programs. The control programs include a control program according to which the electric motor 10 is subjected to vector control, a control program according to which a maximum acceptable motor current value is calculated for a certain capacitor temperature based on a detection result of the temperature sensor 21 or with reference to a map, and a control program according to which a d-axis direct electric current is supplied to the electric motor 10.

The CPU 22 is connected to a gate, or a control terminal, of each of the switching elements Q1 to Q6 through a non-illustrated driver circuit. The CPU 22 is connected to the electric current sensors 18a, 18b and the voltage sensor 19 through a non-illustrated input interface. The CPU 22 outputs control signals to each switching element Q1 to Q6 through the driver circuit based on detection signals from the sensors 18a, 18b, 19, 21. In correspondence with the control signals, the electric motor 10 is controlled in such a manner that the output of the electric motor 10 reaches a target output value. The inverter circuit 16 inverts a direct current voltage supplied from the main battery 14 to a three phase alternating voltage having an appropriate frequency and outputs the alternating voltage to the electric motor 10.

Figure 2:
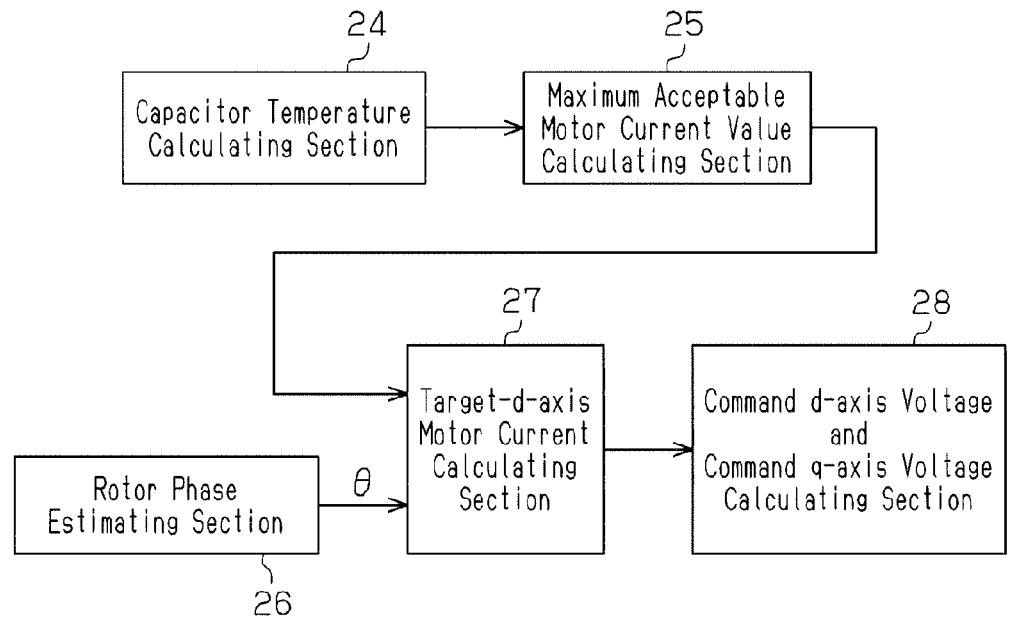
FIG. 2 is a block diagram representing a procedure of calculation performed by the control apparatus shown in FIG. 1.

The control section 13 performs calculation in accordance with the procedure represented in FIG. 2. Specifically, the control section 13 includes a capacitor temperature calculating section 24, a maximum acceptable motor current value calculating section 25, a rotor phase estimating section (a rotor position estimating section) 26, a target d-axis motor current value calculating section 27, and a command voltage calculating section 28. The capacitor temperature calculating section 24 estimates the capacitor temperature in correspondence with the detection signal of the temperature sensor 21. The maximum acceptable motor current value calculating section 25 calculates the maximum acceptable motor current value for the capacitor temperature obtained by the capacitor temperature calculating section 24 with reference to the map. The rotor phase estimating section 26 estimates the rotational position (the rotational phase θ) of the rotor based on the output signals of the electric current sensors 18a, 18b and the voltage sensor 19. The rotational position of the rotor is estimated, for example, in the following manner. That is, a voltage pulse is calculated from the voltage detected by the voltage sensor 19. The voltage pulse is then applied to the U, V, and W phases of the electric motor 10 and the amount of the electric current flowing in each of the phases is detected by the corresponding one of the electric current sensors 18a, 18b. The rotational position of the rotor is then estimated through comparison between the detection signals of the electric current sensors 18a, 18b and a rotor position estimation map stored in the memory 23. The target d-axis motor current value calculating section 27 sets a target d-axis motor current value using the maximum acceptable motor current value obtained by the maximum acceptable motor current value calculating section 25 and the phase θ determined by the rotor phase estimating section 26. The command voltage calculating section 28 calculates a command voltage that is to be supplied to the electric motor 10. In other words, the command voltage calculating section 28 converts a command d-axis electric current and a command q-axis electric current to a corresponding command two-phase voltage. The command two-phase voltage is then converted to a command three-phase voltage corresponding to the U, V, and W phases through a non-illustrated two phase/three phase converting section. Eventually, the command three-phase voltage is output to the electric motor 10.

Figure 4:
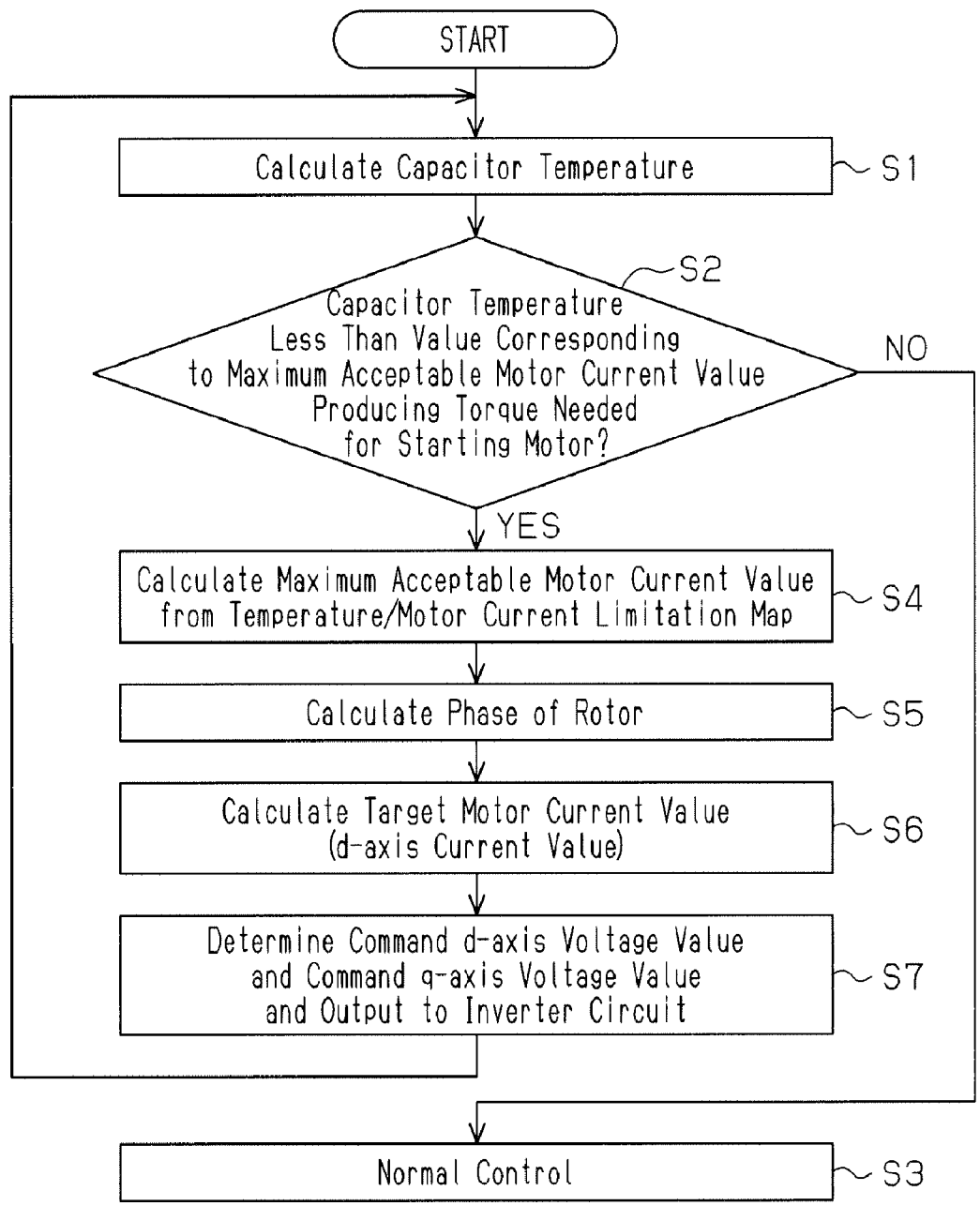
FIG. 4 is a flowchart representing a preheating control procedure carried out by the control apparatus of FIG. 1.
Figure 5:
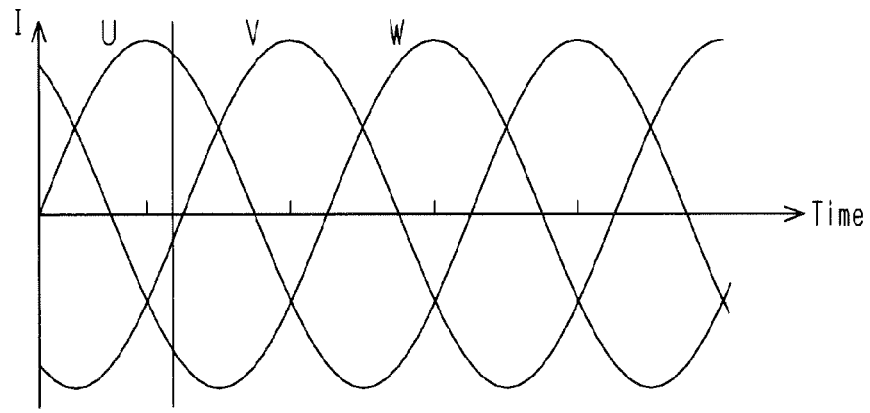
FIG. 5 is a graph representing changes of applied voltages of the U, V, and W phases.
Figure 5:
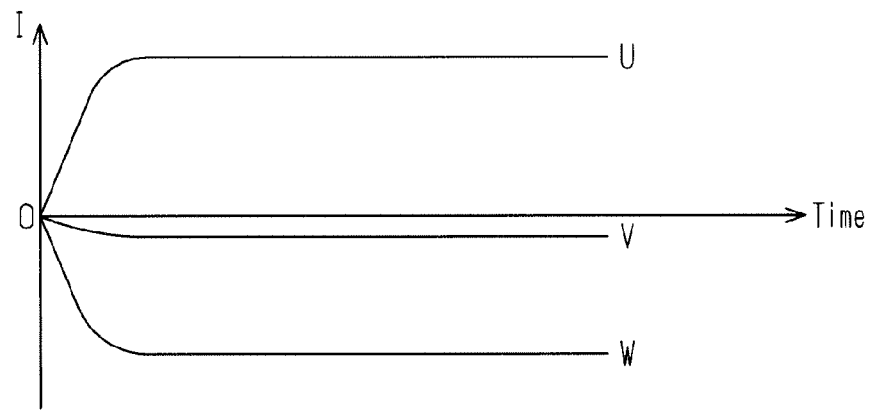

Operation of the control apparatus 11 will hereafter be explained with reference to the flowchart represented in FIG. 4.

Figure 3:
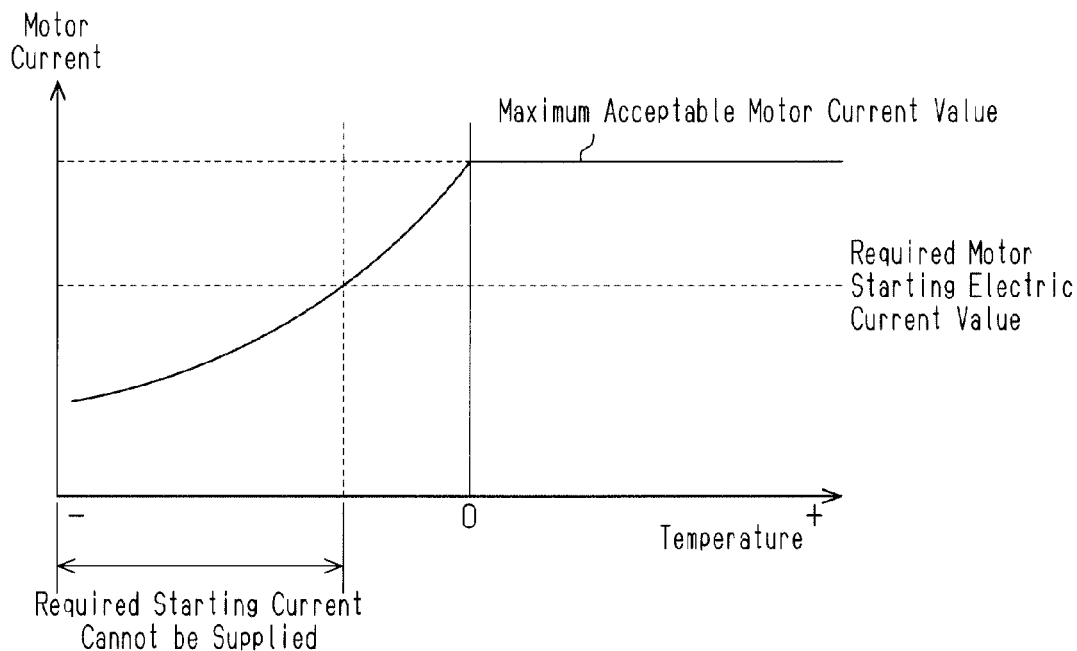
FIG. 3 is a diagram representing the relationship among the maximum acceptable motor current value, the capacitor temperature, and the required motor starting current value.

After the control apparatus 11 is started, the CPU 22 first receives a detection signal from the temperature sensor 21 and calculates the capacitor temperature (step S1). The CPU 22 then determines the maximum acceptable motor current value corresponding to the capacitor temperature with reference to a map representing the relationship between the capacitor temperature and the maximum acceptable motor current value. Also, the CPU 22 determines whether the maximum acceptable motor current value is smaller than a value at which the torque necessary for starting the electric motor 10 is generated (step S2). With reference to FIG. 3, the map stores the relationship among the capacitor temperature, the maximum acceptable motor current value, and the electric current value required for producing the torque necessary for starting the electric motor 10. In the first embodiment, the maximum acceptable motor current is supplied at 0° C. or more, with reference to FIG. 3. However, the maximum acceptable motor current may be supplied at a temperature lower than 0° C., depending on the type of the capacitor employed.

The CPU 22 performs normal control if, in step S2, the capacitor temperature is in a range in which the maximum acceptable motor current value is greater than or equal to a value at which the torque necessary for starting the electric motor 10 is produced (step S3). In the normal control, the switching elements Q1 to Q6 are controlled in such a manner that the d-axis electric current and the q-axis electric current are smaller than the maximum acceptable motor current value and that the output of the electric motor 10 achieves a target speed and a target torque.

If determination of step S2 is positive, that is, if the capacitor temperature is in a range in which the maximum acceptable motor current value is smaller than the value at which the torque necessary for starting the electric motor 10 is produced, the CPU 22 supplies an electric current to the capacitor 20 and performs preheating control. The CPU 22 calculates the maximum acceptable motor current value corresponding to the current capacitor temperature (step S4). The CPU 22 then estimates the rotational position (the phase θ) of the rotor in correspondence with the detection signals of the electric current sensors 18a, 18b and the voltage sensor 19 (step S5). Subsequently, the CPU 22 determines the target d-axis electric current using the calculated maximum acceptable motor current value and the determined phase θ (step S6).

Next, the CPU 22 determines the command d-axis voltage value and the command q-axis voltage value, and outputs a control signal in correspondence with which the d-axis motor current value and the d-axis motor current value reach the target d-axis electric current value and the target q-axis electric current value (0[A]), respectively, to the inverter circuit 16 (step S7). The switching elements Q1 to Q6 are then selectively switched on and off by the duty cycle corresponding to the control signal. At this stage, the target q-axis electric current value is adjusted to 0[A]. This provides a direct electric current corresponding to the target d-axis electric current value to the electric motor 10. Further, the switching elements Q1 to Q6 are selectively switched on and off in such a manner that the direct electric current is supplied also to the capacitor 20. Such supply of the direct electric current to the capacitor 20 heats the capacitor 20. Then, the procedure corresponding to steps S1 to S7 is repeatedly carried out until the capacitor temperature reaches a temperature at which the maximum acceptable motor current value is greater than or equal to the value at which the torque necessary for starting the electric motor 10 is produced. When the capacitor temperature reaches the temperature at which the maximum acceptable motor current value is greater than or equal to the value at which the torque necessary for starting the electric motor 10 is produced, the CPU 22 ends the preheating control and switches to the normal control.

The maximum value of the electric current supplied to the respective one of the U, V, and W phases is determined in correspondence with the maximum acceptable motor current value and the position of the rotor at the current point in time. The CPU 22 controls the voltage supplied to each of the U, V, and W phases in such a manner that the electric current flowing in each of the U, V, and W phases gradually reaches the target electric current value, instead of controlling the voltage supply in such a manner that the target d-axis electric current is supplied to the U, V, and W phases from the start.

The first embodiment has the following advantages.

(1) The control apparatus 11 includes the temperature sensor 21, which detects the temperature the capacitor 20 connected to the input of the inverter circuit 16 or a temperature reflecting the capacitor temperature, and the map representing the relationship between the temperature of the capacitor 20 and the maximum acceptable motor current value, which prevents a component of the inverter device 12 from being damaged by a surge voltage produced by an equivalent series resistance of the capacitor 20. The control apparatus 11 controls the inverter circuit 16 in such a manner that an electric current smaller than the maximum acceptable motor current value flows in the electric motor 10, using the map. In this manner, the components of the inverter device 12 are prevented from being damaged by the surge voltage under a low temperature.

(2) The control apparatus 11 has the maximum acceptable motor current value calculating section 25, which calculates the maximum acceptable motor current value based on the map. The control apparatus 11 further includes the control section 13, which controls the inverter device 12 in such a manner that a direct electric current smaller than the maximum acceptable motor current value is supplied to the electric motor 10 as a d-axis electric current based on the position of the rotor estimated from the detection signals of the electric current sensors 18a, 18b and the voltage sensor 19 and the maximum acceptable motor current value calculated by the maximum acceptable motor current value calculating section 25. If the temperature of the capacitor 20 is in the range in which the maximum acceptable motor current value is smaller than the value at which the torque necessary for starting the electric motor 10 is produced, the control apparatus 11 performs the preheating control. Specifically, the control apparatus 11 supplies a d-axis electric current smaller than the maximum acceptable motor current value to the capacitor 20, thus heating the capacitor 20. The control apparatus 11 then provides an alternating electric current to the electric motor 10 to start the electric motor 10. As a result, if the capacitor temperature is in the range in which the maximum acceptable motor current value is smaller than the value at which the torque necessary for starting the electric motor 10 is generated, that is, if the ambient temperature (the temperature in the environment) of the control apparatus 11 is low, the torque required for starting the electric motor 10 is produced while an excessively great surge voltage is prevented from being generated.

(3) The position of the rotor is estimated based on the detection signals of the electric current sensors 18a, 18b and the voltage sensor 19. This makes it unnecessary to provide an additional sensor for estimation of the rotational position of the rotor of the electric motor 10.

(4) In the preheating control performed on the capacitor 20, the switching elements Q1 to Q6 are selectively switched on and off in such a manner that the electric current supplied to the electric motor 10 gradually increases to the target electric current value (the maximum acceptable motor current value), instead of operating the switching elements Q1 o Q6 in such a manner that the target d-axis electric current is supplied to the electric motor 10 from the start. This decreases an overshoot current and suppresses noise.

(5) The electric motor 10 is an electric motor for an electric compressor. If the electric compressor is driven at a low temperature (which is, for example, 0° C. or lower), the refrigerant compressed by the compressor liquefies and increases the torque necessary for driving the electric motor 10. Thus, without the preheating control, the range of the temperature that allows the electric motor 10 to be actuated at a low temperature is limited. However, through the preheating control, such range is enlarged. The electric motor 10 is thus desirable for use as the electric motor for an electric compressor.

Figure 6:
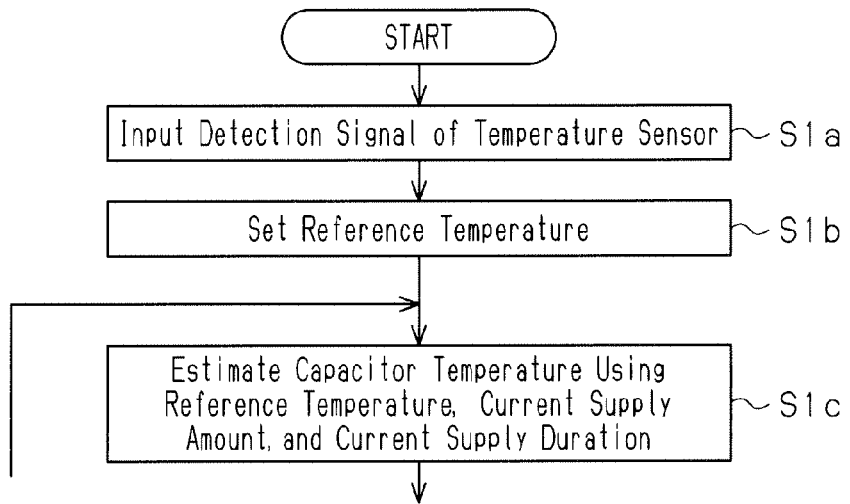
FIG. 6 is a flowchart representing a preheating control procedure performed by a control apparatus according to a second embodiment of the present invention.

A second embodiment of the present invention will hereafter be described with reference to FIG. 6. The second embodiment employs a method for calculating the capacitor temperature different from that of the first embodiment. Same or like reference numerals are given to components of the second embodiment that are the same as or like corresponding components of the first embodiment and explanation thereof is omitted.

In the first embodiment, the CPU 22 receives the current detection signal of the temperature sensor 21 and calculates the capacitor temperature. However, in the second embodiment, the CPU 22 calculates the capacitor temperature based on the detection signal of the temperature sensor 21 restrictedly when the inverter device 12 is started. Afterwards, the capacitor temperature when the inverter device 12 is started is employed as a reference temperature. The CPU 22 thus estimates (calculates) the capacitor temperature based on the reference temperature, the amount of the electric current supplied to the inverter device 12, and the duration of such electric current supply.

The memory 23 stores the reference temperature, and a map or an expression using which the capacitor temperature after starting of the control apparatus 11 is calculated based on the amount of the electric current supplied to the inverter device 12 and the duration of such electric current supply. The map is created in advance through a simulation or actual operation of the electric motor 10. Further, the CPU 22 consecutively calculates the amount of the electric current supplied to the inverter device 12 and the duration of such electric current supply and stores the results in the memory 23.

Operation of the control apparatus 11 according to the second embodiment will hereafter be explained with reference to the flowchart of FIG. 6. In the second embodiment, the control apparatus 11 performs the same procedure as that of the first embodiment except for steps corresponding to step S1. Thus, in FIG. 6, steps S2 to S7 of FIG. 4 are omitted. As illustrated in FIG. 6, in the second embodiment, the control apparatus 11 sequentially carries out step S1a, step S1b, and step S1c, instead of step S1. After step S7 of the flowchart of FIG. 4, the control apparatus 11 returns to step S1c instead of step S1.

Specifically, in the second embodiment, after the control apparatus 11 is started, the CPU 22 receives the detection signal of the temperature sensor 21 (step S1a). The CPU 22 then determines the capacitor temperature, sets the capacitor temperature to the reference temperature, and stores the reference temperature in the memory 23 (step S1b). Subsequently, the CPU 22 determines the capacitor temperature after starting of the control apparatus 11 in correspondence with the reference temperature, the amount of the electric current supplied by the current point in time, and the duration of such electric current supply, using the map (step S1c). The CPU 22 then performs steps S2 to S7 as in the first embodiment. After step S7, the CPU 22 returns to step S1c. In other words, the second embodiment is different from the first embodiment in that reception of the detection signal from the temperature sensor 21 by the CPU 22 occurs restrictedly when the control apparatus 11 is started. The CPU 22 calculates the capacitor temperature in correspondence with the reference temperature, the amount of the electric supplied by the current point in time, and the duration of such electric current supply using the map, without receiving the detection signal of the temperature sensor 21, not only in the preheating control but also after the control by the CPU 22 is switched to the normal control.

The second embodiment has the following advantage in addition to the advantages equivalent to those described in (1) to (5) of the first embodiment. As of the advantage equivalent to (2), instead of calculating the maximum acceptable motor current value corresponding to the temperature detected by the temperature sensor 21 with reference to the map, the maximum acceptable motor current value corresponding to the calculated capacitor temperature is determined in correspondence with the reference temperature, the amount of the electric current supplied by the current point in time, and the duration of such electric current supply, using the map.

(6) Under a low ambient temperature (for example, 0° C. or lower), the temperature of each portion of the inverter device 12 dose not become equivalent to the capacitor temperature or change in proportion to the capacitor temperature while the capacitor temperature is raised through warm-up of the electric motor 10. Particularly, the temperatures of the portions spaced from the capacitor 20 do not reflect the capacitor temperature. Thus, if the temperature sensor 21 is located at a position at which the local temperature does not reflect the actual temperature of the capacitor 20, the increase amount of the capacitor temperature becomes extremely small, despite the fact that the actual temperature of the capacitor 20 rises as the time elapses since starting of the electric motor 10. This decreases the amount of the d-axis electric current supplied in the preheating control. As a result, an extended time is required for the time the motor current to become the value required for producing the torque necessary for starting the electric motor 10. However, in the second embodiment, the capacitor temperature when the inverter device 12 is started obtained by the temperature sensor 21 is employed as the reference temperature. The temperature of the capacitor 20 is estimated in correspondence with the reference temperature, the amount of the electric current supplied to the inverter device 12, and the duration of such electric current supply. Accordingly, regardless of the position at which the temperature sensor 21 is deployed, the temperature of the capacitor 20 is estimated accurately. Thus, a limited electric current corresponding to the actual temperature of the capacitor 20 is provided as the d-axis electric current. As a result, the warm-up of the electric motor 10 is completed quickly. Further, even if the temperature sensor 21 is arranged at the position at which increase of the temperature of the capacitor 20 is not reflected at a low ambient temperature (for example, 0° C. or lower), it is unnecessary to employ an additional sensor that directly detects the temperature of the capacitor 20.

Figure 7:
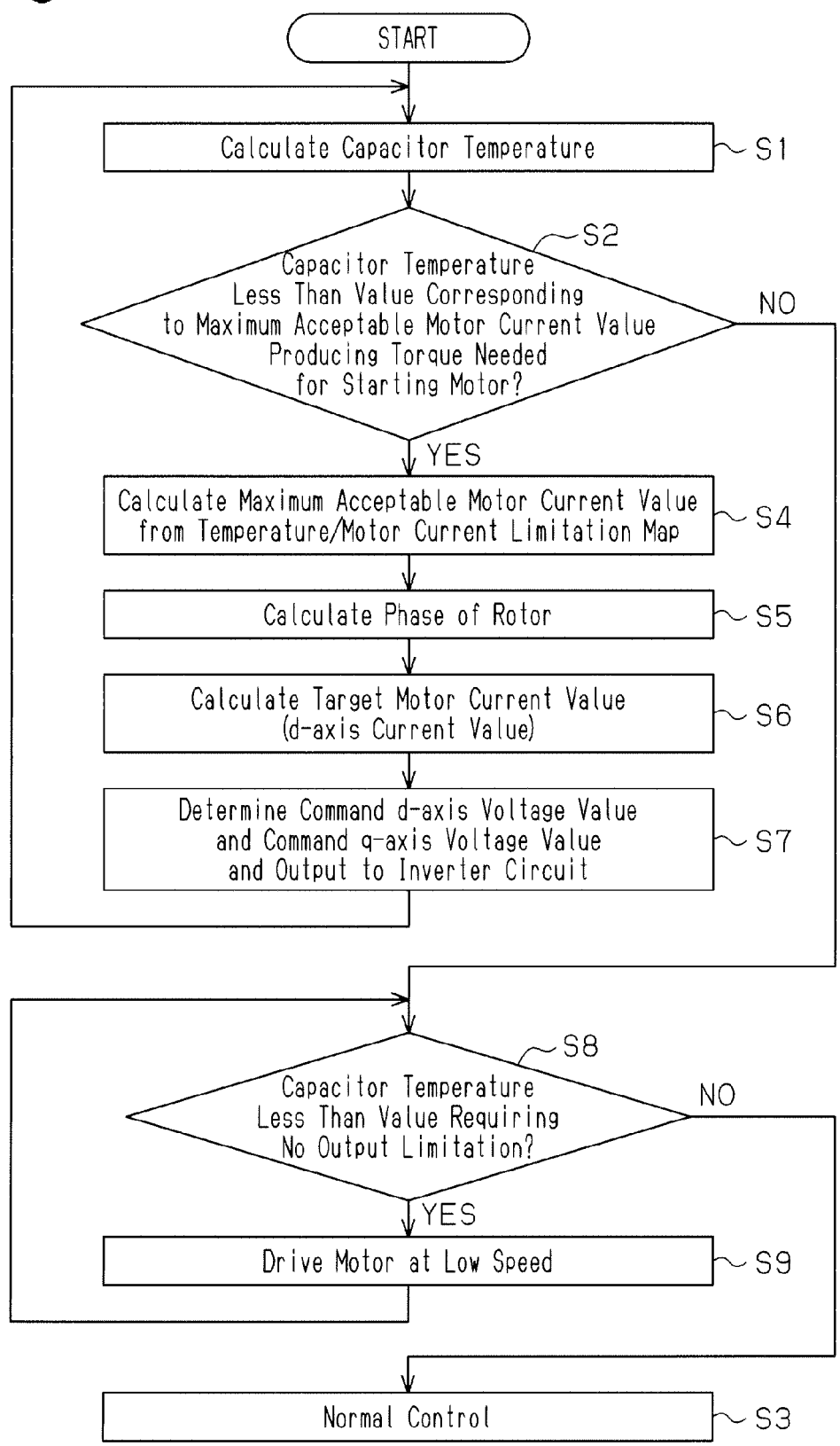
FIG. 7 is a flowchart representing a preheating control procedure performed by a control apparatus according to a third embodiment of the present invention.

A third embodiment of the present invention will hereafter be explained with reference to FIGS. 7 and 8. The third embodiment employs conditions different from those of the first embodiment when the preheating control is switched to the normal control. Same or like reference numerals are given to components of the third embodiment that are the same as or like corresponding components of the first embodiment and explanation thereof is omitted.

In the first embodiment, the normal control is carried out if the capacitor temperature reaches the range in which the maximum acceptable motor current value is greater than or equal to the value at which the torque necessary for starting the electric motor 10 is produced. In the third embodiment, after the capacitor temperature reaches this range, the q-axis electric current is supplied to the electric motor 10 with the motor output being limited, and a surplus electric current that can be supplied under such output limitation is fed to the electric motor 10 as the d-axis electric current, until the capacitor temperature reaches a value at which the output limitation becomes unnecessary. After the capacitor temperature reaches the value, the normal control is performed.

The control apparatus 11 of the third embodiment is different from that of the first embodiment in that steps S8, S9, S10 are carried out instead of step S3 of the first embodiment.

In the third embodiment, if determination of step S2 is negative, that is, the capacitor temperature is in the range in which the maximum acceptable motor current value is greater than or equal to the value at which the torque necessary for starting the electric motor 10 is produced, the CPU 22 determines whether the capacitor temperature is lower than a temperature at which output limitation is unnecessary (step S8). If negative determination is made in step S8, or the capacitor temperature is greater than or equal to the temperature at which the output limitation is unnecessary, the CPU 22 carries out the normal control (step S10).

If determination of step S8 is positive, that is, if the capacitor temperature is less than the value at which the output limitation is unnecessary, the CPU 22 operates the electric motor 10 at a low speed (step S9). In other words, when the electric motor 10 is rotated at a low speed, the capacitor temperature is less than a value at which the maximum acceptable motor current value can be supplied, or the value at which the output limitation is unnecessary. The CPU 22 controls the electric motor 10 in such a manner that the output of the electric motor 10 becomes close to the torque required by a load without exceeding the maximum acceptable motor current value corresponding to the capacitor temperature. At this stage, even if the CPU 22 is capable of supplying the electric current corresponding to the required torque to the electric motor 10 from the start, the CPU 22 controls the inverter device 12 in such a manner that the electric current value increases sequentially at regular time intervals, as illustrated in FIG. 8, instead of supplying the electric current corresponding to the required torque to the electric motor 10 from the start.

Figure 8:
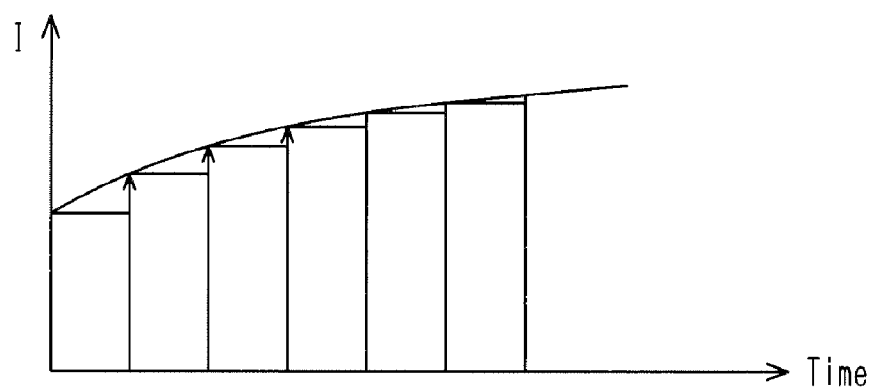
FIG. 8 is a graph representing changes over time of an electric current supplied to an electric motor by the control apparatus according to the third embodiment of the invention.
Figure 9:
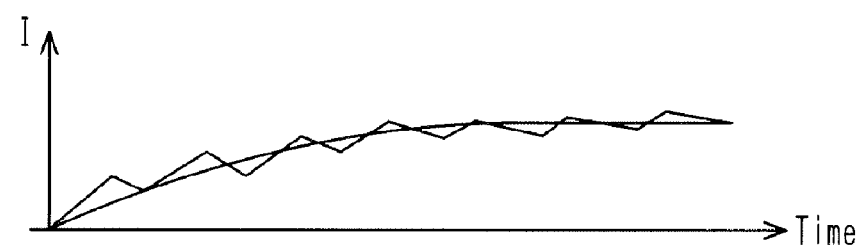
FIG. 9 is a graph representing the relationship between the switching time and the electric current flowing in the cable of the U phase according to another embodiment.
Figure 9:
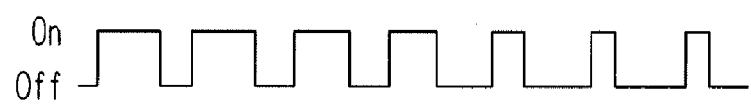

The q-axis electric current is set to the value corresponding to the current electric current value at each point of time of FIG. 8. The d-axis electric current is set to a maximum electric current value not exceeding the limitation value at the current temperature. As a result, if the electric current corresponding to the torque required by the load is continuously maintained smaller than the maximum acceptable motor current value at the current temperature, the electric motor 10 is warmed up in a short period of time, compared to a case in which a d-axis electric current corresponding to a q-axis electric current is supplied.

The third embodiment has the following advantage in addition to the advantages equivalent to (1) to (5) of the first embodiment.

(7) After the capacitor temperature increases to the range in which the maximum acceptable motor current value is greater than or equal to the value at which the torque necessary for starting the electric motor 10 is produced, the q-axis electric current is supplied and an electric current is fed by an amount permitted under such limitation until the capacitor temperature reaches the value at which the output limitation is necessary. This shortens the period of time until the capacitor temperature reaches the value at which the output limitation is necessary. Thus, the electric motor 10 is allowed to operate in correspondence with a great required torque at an early stage.

The illustrated embodiments are not restricted to the above description but may be modified in the following manners.

The position of the rotor may be estimated in the following manner. Specifically, a constant electric current is supplied to the cable of each of the U, V, and W phases of the electric motor 10. The voltage of each of the cables is detected by a voltage sensor. The position of the rotor is estimated based on a detection signal of the voltage sensor. In this case, a voltage sensor that detects the voltages of the cables of at least two of the U, V, and W phases is provided.

A rotor position sensor 30, which is included in the rotor phase estimating section, may be provided in the electric motor 10 to detect the position of the rotor as shown by a dashed line in FIG. 1. The rotor position sensor 30 may be, for example, a rotary encoder or a resolver.

The switching frequency of the switching elements Q1 to Q6 in the preheating control of the capacitor 20 may be higher than the switching frequency of the switching elements Q1 to Q6 in the normal control. This shortens the cycle at which the electric current flows to and from the capacitor 20, thus raising the temperature of the capacitor 20 quickly. The switching frequency in the normal control is not more than several hundreds of microseconds.

In preheating of the capacitor 20, the on-duty of the switching elements Q1 to Q6 may be gradually decreased so that the amount of the electric current flowing in each of the U, V, and W phases increases. FIG. 6 represents changes of the electric current flowing in the cable of the U phase. This further decreases an overshoot electric current.

Through the preheating control, the capacitor temperature rises to the range in which the maximum acceptable motor current value is greater than or equal to the value at which the torque necessary for starting the electric motor 10 is produced. After that, when an alternating electric current is supplied to the electric motor 10, the electric motor 10 may be operated with a lower target torque for a predetermined time before the target torque is raised. In this case, the electric motor 10 is operated stably compared to the case in which the electric motor 10 is operated with the raised target torque from the start.

Supply of an alternating electric current to the electric motor 10, which is to start the electric motor 10, does not necessarily have to be started immediately after the temperature of the capacitor 20 reaches the temperature at which the corresponding maximum acceptable motor current value produces the torque necessary for starting the electric motor 10. Instead, the electric motor 10 may be started after the temperature of the capacitor 20 increases to 0° C. or higher.

In the third embodiment, the capacitor temperature is calculated from the detection signal of the temperature sensor 21 at each reception of the signal. However, as in the second embodiment, calculation of the capacitor temperature may be performed only when the control apparatus 11 is started. Afterwards, the capacitor temperature is calculated in correspondence with the reference temperature, the amount of the electric current supplied by the current point in time, and the duration of such current supply using the map.

In the second embodiment, the capacitor temperature when the inverter device 12 is started is employed as the reference temperature. The capacitor temperature is calculated based on the reference temperature, the amount of the electric current supplied to the inverter device 12, and the duration of such current supply. However, such method of calculation may be employed only in the preheating control. In this case, after the capacitor temperature rises sufficiently high exceeding, for example, 0° C., the temperature of the capacitor 20 may be calculated based on the detection signal of the temperature sensor 21.

The memory 23 may store an expression representing the relationship between the maximum acceptable motor current value and the capacitor temperature, instead of the map representing such relationship. The maximum acceptable motor current value is calculated using the expression.

If the electric motor 10 is driven through the inverter device 12, the electric motor constant changes depending on the electric motor specification. This correspondingly changes the capacitor temperature and the motor current limitation map according to which the inverter device 12 is optimally controlled and commanded. When multiple types of motors 10 of different specifications are manufactured and specific information necessary for calculation of motor output is provided to the respective motors 10, management load of software increases. Also, erroneous writing of the software may occur. If the necessary information is to be provided as a mask ROM instead of the software, a large number of types of mask ROMs must be provided, which may lead to erroneous installment. To solve these problems, information necessary for calculation of the outputs of the electric motors of different specifications may be provided as maps included in software. To use the map, the type of the electric motor is specified using a switch or a pull-up/pull-down resistor external to the ROM. In this case, only one type of software is necessary, and the management load of the software decreases. Also, erroneous writing of the software is prevented. If a bug occurs in a basic software portion, the problem is solved only by changing the single software. If the information is provided as the mask ROM, the switching cost due to bugs or the like is advantageously reduced.

The switching elements Q1 to Q6 may be MOSFETs or bipolar transistors.

The electric motor 10 is not restricted to an electric motor for an electric compressor. The electric motor 10 may be any suitable type, as long as the electric motor is controlled through an inverter and used under low temperature. For example, the electric motor 10 may be an electric motor used in a vehicle or an electric motor for a machining tool. If the electric motor 10 is the electric motor for the vehicle, the electric motor 10 effectively functions at a temperature below the freezing point.

What is claimed is:

1. A method for adjusting a motor current supplied to an electric motor using an inverter device, the inverter device including an inverter circuit and a capacitor connected to an input of the inverter circuit, the method comprising:

setting a maximum acceptable motor current value using a map or an expression representing a relationship between a temperature of the capacitor and a maximum value of the motor current that prevents a component of the inverter device from being damaged by a surge voltage produced by an equivalent series resistance of the capacitor;

estimating a rotational position of a rotor of the electric motor and controlling the inverter circuit in such a manner as to supply a direct electric current smaller than the maximum acceptable motor current value to the electric motor as a d-axis electric current if the temperature of the capacitor is in a range in which the maximum acceptable motor current value is smaller than a value at which a torque necessary for starting the electric motor is produced; and controlling the inverter circuit in such a manner as to supply an alternating electric current to the electric motor after the temperature of the capacitor reaches a temperature at which the maximum acceptable motor current value becomes greater than or equal to the value at which the torque necessary for starting the electric motor is produced.

2. The method according to claim 1, wherein the electric motor has a U phase, a V phase, and a W phase, and wherein the rotational position of the rotor is estimated based on an electric current signal or a voltage signal obtained from cables of the U, V, and W phases when a certain level of voltage or electric current is supplied to the cables.

3. The method according to claim 1, further comprising:
measuring a temperature of a portion other than the capacitor as a reference temperature when the inverter device is started; and
estimating the temperature of the capacitor based on the reference temperature, an amount of the electric current supplied to the inverter device, and a duration of the electric current supply to the inverter device.

4. The method according to claim 1, further comprising supplying a q-axis electric current to the electric motor while limiting an output of the inverter to a value smaller than or equal to a limitation value and feeding a surplus electric current that can be supplied under such output limitation to the inverter as a d-axis electric current, until the temperature of the capacitor reaches a temperature at which limitation of the inverter output becomes unnecessary after the temperature of the capacitor has reached a temperature at which the maximum acceptable motor current value becomes greater than or equal to the value at which the torque necessary for starting the electric motor is produced.

5. An apparatus for adjusting a motor current supplied to an electric motor using an inverter device, the inverter device including an inverter circuit and a capacitor connected to an input of the inverter circuit, the apparatus comprising:
a temperature detecting section that detects a temperature of the capacitor or a temperature reflecting the temperature of the capacitor,
a memory section that stores a map or an expression representing a relationship between a maximum acceptable motor current value and the temperature of the capacitor, the maximum acceptable motor current value being a maximum value of the motor current that prevents a component of the inverter device from being damaged by a surge voltage produced by an equivalent series resistance of the capacitor;
a rotor position estimating section that estimates a rotational position of a rotor of the electric motor;
a maximum acceptable motor current value calculating section that calculates the maximum acceptable motor current value corresponding to the temperature of the capacitor based on a temperature detected by the temperature detecting section and either of the map or the expression; and
an inverter device control section that controls the inverter circuit in such a manner as to supply a direct electric current smaller than the maximum acceptable motor current value to the electric motor as a d-axis electric current based on the rotational position of the rotor estimated by the rotor position estimating section and the maximum acceptable motor current value calculated by the maximum acceptable motor current value calculating section.

6. The apparatus according to claim 5, wherein the rotor position estimating section includes a rotor position sensor.

7. The apparatus according to claim 5, wherein the electric motor is an electric motor for an electric compressor.

* * * * *